US006216659B1

(12) United States Patent
Takegami et al.

(10) Patent No.: US 6,216,659 B1
(45) Date of Patent: Apr. 17, 2001

(54) ENGINE CYLINDER HEAD

(75) Inventors: Masaki Takegami; Susumu Yasuyama, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/426,830

(22) Filed: Oct. 25, 1999

(30) Foreign Application Priority Data

Oct. 28, 1998 (JP) ........................................ 10-307642

(51) Int. Cl.[7] ........................................ B60R 7/00
(52) U.S. Cl. ........................................ 123/193.5
(58) Field of Search ........................ 123/193.5, 90.38, 123/193.3

(56) References Cited

U.S. PATENT DOCUMENTS 3,869,859 * 3/1975 Thornburgh ...................... 123/90.38
4,502,427 * 3/1985 Brille ...................... 123/90.41
5,492,086 * 2/1996 Kuhns ...................... 123/90.38
5,601,057 * 2/1997 Treyz et al. ...................... 123/193.5

* cited by examiner

*Primary Examiner*—Marguerite McMahon
(74) *Attorney, Agent, or Firm*—Ernest A. Beutler

(57) ABSTRACT

A push rod operated multi-valve V-type engine particularly adapted for use in motorcycles or like vehicles and which engine is air cooled. The engine employs a very simplified construction and overhead valve actuating mechanism utilizing push rods. The push rods are contained within push rod tubes formed at one side of the engine that provide a neat appearance and ease of servicing without adversely affecting the air cooling. A composite cylinder head construction is employed, as well as an improved and simplified lubricating system for the pair of driven camshafts.

18 Claims, 18 Drawing Sheets

ENGINE CYLINDER HEAD

BACKGROUND OF THE INVENTION

This invention relates to an internal combustion engine and more particularly to an improved cylinder head construction for such engines.

As is well known, internal combustion engines whether they are four or two cycle type generally are comprised of three major external engine bodies. These include the cylinder head body, the cylinder block body, and the crankcase body. Sometimes these bodies are combined and other times parts of each body may be formed from a part of the adjacent body. For the most part, however, each body is a separate element and is detachably or otherwise connected to the remaining bodies.

This presents significant problems with connection with the cylinder head design, particularly where the engine is of the four cycle type and has overhead valves and a valve actuating mechanism that is mounted in the cylinder head for operating these valves. It is quite difficult to provide a single piece assembly that will serve all of the purposes and which can be made in mass production quantities at a relatively low cost and still have high accuracy.

For example, motorcycle engines may at times utilize overhead valves that are operated by one or more cam shafts positioned in the crankcase or at a lower portion of the engine and operated via push rods and rocker arms. With such an arrangement, the cylinder head must form the combustion chamber surface, the intake and exhaust passages and valve seats for gas exchange with the combustion chamber, the mounting for the valves for controlling the flow through these passages and the actuating mechanisms for operating these valves. Furthermore, the actuating mechanism is frequently contained within a cover so as to protect the mechanism and particularly permit its lubrication without encroachment of foreign material into the mechanism while permitting ease of access for servicing.

Thus, many times the engine cylinder head is comprised of a main cylinder head member and a cam or valve cover that covers the outer periphery of the cylinder head member. However, this still gives rise to certain problems in connection with mounting all of the various components and arranging them in the cylinder head.

It is, therefore, a principal object of this invention to provide an improved cylinder head assembly for an overhead valve engine wherein the cylinder head is made up of a few major parts that are detachably connected to each other so as to facilitate production, maintain close tolerances and still keep the cost low.

It is a further object of this invention to provide an improved and simplified multi-piece cylinder head assembly for an overhead valve engine.

As has been noted, serviceability as well as assembly are important in the design. This is particularly true with respect to the cylinder head assembly. Its components are among those which require periodic adjustment or other servicing.

It is, therefore, a still further object of this invention to provide an improved and simplified cylinder head assembly of multi-piece construction to facilitate assembly as well as servicing.

SUMMARY OF THE INVENTION

This invention is adapted to be embodied in a cylinder head assembly for an internal combustion engine. The cylinder head assembly is comprised of at least four major components. These components include a main cylinder head member which forms the combustion chamber with the piston and associated cylinder bore as well as the flow passages for induction into the combustion chamber and exhaust from the combustion chamber. In addition, a rocker arm carrier is adapted to be detachably connected to the main cylinder head member and supports at least some components for the valve actuating mechanism for operating valves that control the flow through the flow passages of the main cylinder head member. A cylinder head cover assists in detachably connecting the rocker arm carrier to the main cylinder head member and provides a peripheral area around the valve operating mechanism. Finally, a valve cover is affixed to the other members and encloses the valve operating mechanism as well as facilitating its servicing.

DETAILED DESCRIPTION OF THE PREFERRED EMBODIMENT OF THE INVENTION

Figure 1:
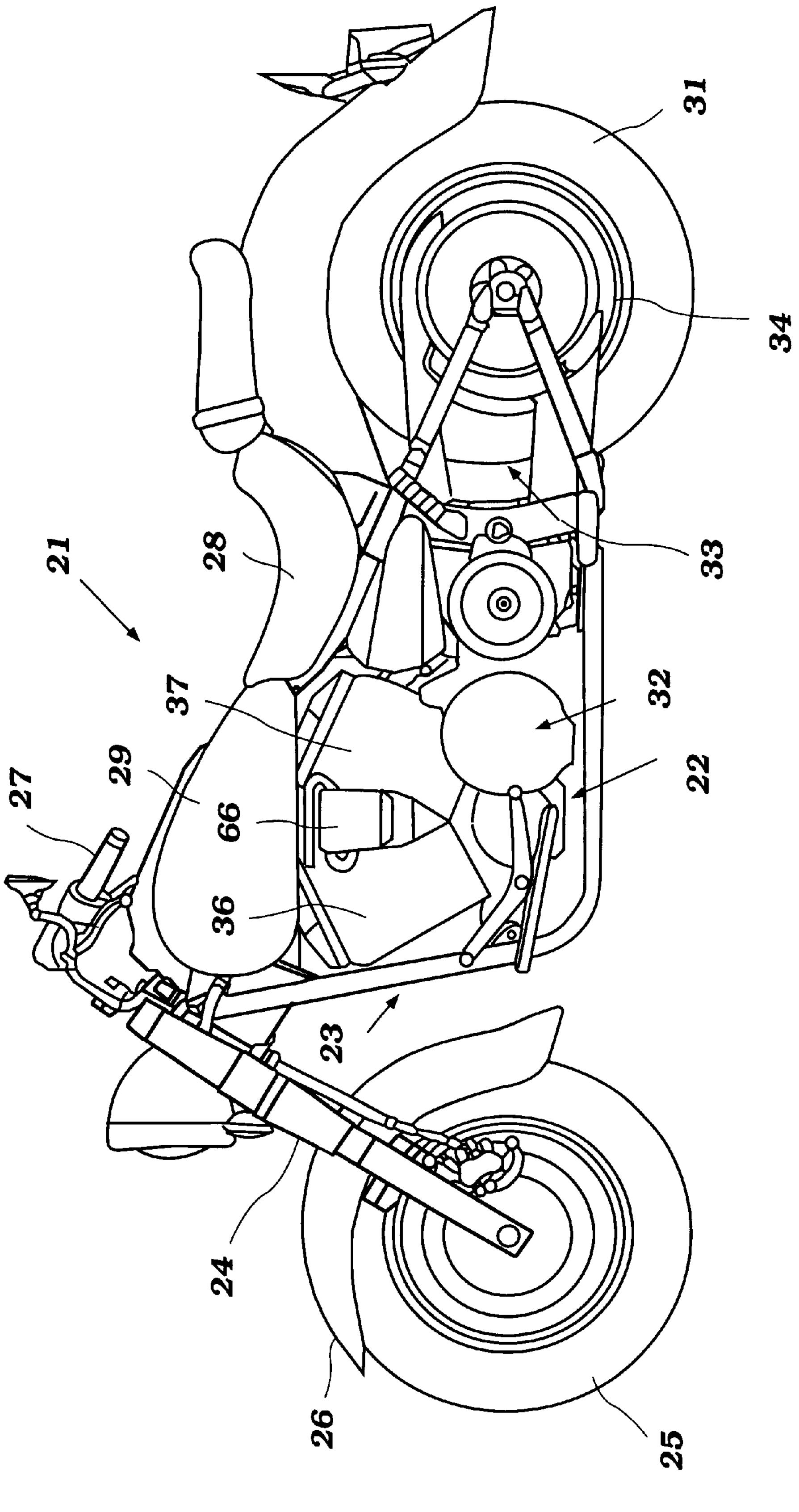
FIG. 1 is a side elevational view of a motorcycle constructed in accordance with an embodiment of the invention.

Referring first primarily to FIG. 1, a motorcycle is illustrated in side elevational view and is identified generally by the reference numeral 21. The motorcycle 21 is powered by an internal combustion engine, indicated generally by the reference numeral 22 and which is constructed in accordance with an embodiment of the invention. The motorcycle 21 is shown as a typical environment in which the invention may be utilized.

The invention has particular utility in conjunction with motorcycle applications because the engine 22 is substantially exposed, is air cooled and also must be compact in construction and provide a high specific output. Although this specific environment is shown as a typical environment with which the invention may be utilized, it will be readily apparent to those skilled in the art how the features of the engine 22 can be utilized with a number of other applications.

The motorcycle 21 is comprised of a frame assembly 23 upon which the engine 22 is suspended in a known manner. This frame assembly 23 dirigibly supports a front fork 24 on which a wheel 25 is rotatably journaled. A fender 26 covers this front wheel 25. The steering of the vehicle is controlled by a handlebar assembly 27 that is fixed to the upper end of the front fork 24 in a manner well known in this art.

A rider's seat 28 is carried by the frame assembly 23 rearwardly of the engine 22 and above it. A fuel tank 29 for the engine is mounted on the frame 23 forwardly of the seat 28.

Finally, a rear wheel 31 is journaled by the frame assembly 23 in a suitable manner and is driven by a transmission contained within a crankcase transmission assembly 32 of the engine 22 through a final drive which may comprise a driving belt covered by a cover 33 for driving a pulley 34 or sprocket fixed for rotation with the rear wheel 31.

The construction of the engine 22 will now be described in more detail referring first primarily to FIGS. 2 and 3. In the illustrated embodiment, the engine 22 is of the V twin type and operates on a four cycle principle. To this end, the engine 22 is comprised of an engine body assembly including a cylinder block portion, indicated generally by the reference numeral 35, which is formed with a pair of angularly related cylinder banks 36 and 37 that are disposed at a V angle to each other. These cylinder banks 36 and 37 are formed by cylinder barrels that are affixed to an upper portion of a crankcase member 38 which with the cylinder banks 36 and 37 completes the cylinder block portion 35.

The crankcase member 38 defines a crankcase portion of the engine body that includes the combined crankcase transmission assembly 32 and rotatably journals a crankshaft 39 in any suitable manner.

Each cylinder bank 36 and 37 is formed with a respective cylinder bore 41 in which a piston 42 reciprocates. The pistons 42 are connected to the upper or small ends of connecting rods 43 in a known manner. The connecting rods 43 are journaled in side-by-side relationship on a throw of the crankshaft 39 as best seen in FIG. 3.

Figure 10:
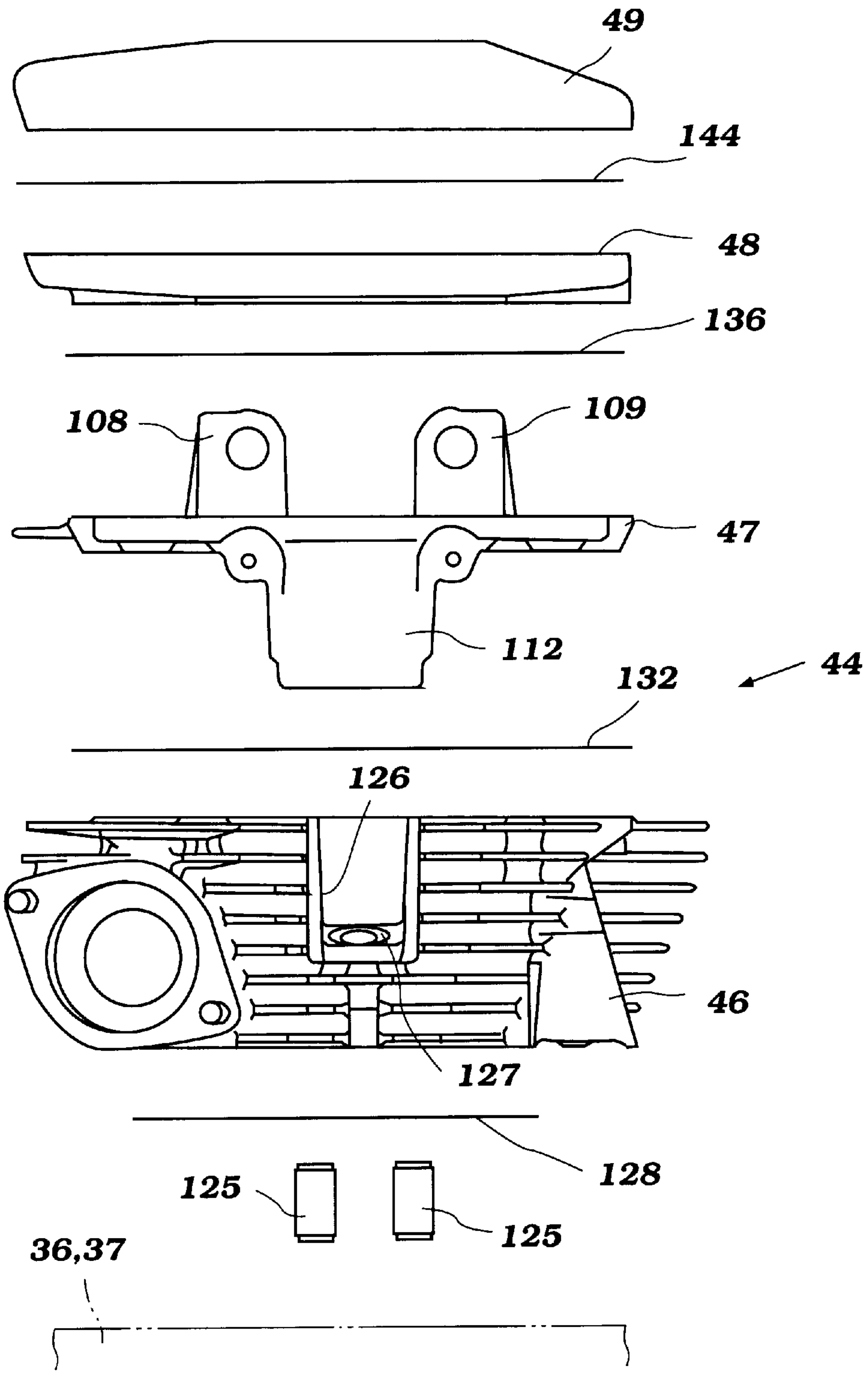
FIG. 10 is an exploded view showing one of the cylinder head assemblies.

A cylinder head assembly, indicated generally by the reference numeral 44 is affixed to each cylinder bank 36 and 37 by means that include threaded fasteners 45. In accordance with the invention, the cylinder head assemblies 44 are each made up of four major components. These comprise a main cylinder head member 46, a rocker arm carrier 47, a cylinder head cover 48 and a valve cover 49. These main components are shown in FIG. 10 and will be described in more detail later by reference to this and other figures, specifically FIGS. 11–17.

Still continuing to refer primarily to FIGS. 2 and 3, the transmission assembly for driving the rear wheel 31 from the crankshaft 39 will now be described. As has been previously noted, this transmission assembly is contained in part in the combined crankshaft transmission assembly 32.

Affixed to one end of the crankshaft 39 is a main drive gear 51 which is enmeshed with a driven gear 52 of a change speed transmission, indicated generally by the reference numeral 53. The driven gear 52 is coupled via a selectively actuatable multiple disc clutch 54 to a primary shaft 55 of the change speed transmission 53.

This primary shaft 55 carries a plurality of primary gears which are enmeshed with secondary gears that are carried on a secondary shaft 56 of the transmission 53. By selectively coupling the gears on the primary and secondary shafts 55 and 56 to the shafts through a suitable shifting mechanism, it is possible to change the drive ratio between the crankshaft 39 and the secondary shaft 56. The secondary shaft 56 thus, functions as the output shaft of the change speed transmission 53.

An understanding of the details of the transmission 53 is not believed to be necessary to permit those skilled in the art to practice the invention. It should be readily apparent that the invention may be utilized in conjunction with any desired type of transmission.

The secondary transmission shaft 56 or output shaft carries a sprocket or toothed wheel 57 which is engaged with a drive belt 58. This drive belt 58 is contained within a transmission case enclosed by a cover assembly 59.

The drive belt 58 drives a further sprocket 61 that is coupled to a transmission output shaft 62. A further drive sprocket or pulley 63 is affixed to the opposite end of this output shaft 62. This belt drives the rear wheel sprocket 34 as previously noted.

The general construction of the cylinder head assembly 44 will now be described by primary reference to FIGS. 3–5 and 10. A more detailed description of each cylinder head assembly 44 and its manner of attachment to the respective cylinder bank 36 or 37 will follow later in connection with the detailed description of FIGS. 10–17.

As has been previously noted, the cylinder head assembly 44 is made up of four major components, the main cylinder head member 46, the rocker arm carrier 47, the cylinder head cover 48, and the valve cover 49. These components are preferably formed from light alloy materials, such as cast aluminum or aluminum alloys.

The main cylinder head member 46 is formed with a recess 64 in its lower surface which overlies the cylinder bore 41 of the respective cylinder bank and forms the combustion chamber of each cylinder bank 36 and 37 with the head of the piston 42 and with the cylinder bore 41. In the illustrated embodiment, the cylinder head recess 64 is formed with four ports, two of which lie on the side of the engine toward the valley between the cylinder banks 36 and 37 and which comprise intake ports indicated by the reference numerals 65.

These ports are served and supplied with a fuel air charge by an induction system. This induction system includes carburetors or other charge formers 66 that are conveniently disposed between these cylinder banks 36 and 37 and which are associated with the intake passages 67 of the respective cylinder head assemblies 44. These charge formers will be described in more detail later. These passages terminate in an outer surface of each cylinder head member 46 and receive the respective carburetors 66.

Poppet-type intake valves 68 are slidably supported in each cylinder head member 46 by means that include valve guides 69. These valves 68 are urged toward their closed position in closing relationship to the intake ports 65 by coil compression spring assemblies 71. These spring assemblies 71 act against keeper retainer assembly 72 for holding the valve 68 in their closed position. The mechanism for opening the valves 68 will be described later.

On the side of the cylinder head recesses 64 opposite the intake ports 65, there are provided exhaust ports 73. These exhaust ports 73 are valved by poppet-type exhaust valves 74 which are also reciprocally mounted in the cylinder head members 46 by means of valve guides 75. Coil compression spring assemblies 76 act against keeper retainer assembly 77 for holding the exhaust valves 74 in their closed position. These exhaust valves 74 are opened in a manner which will also be described shortly.

The exhaust ports 73 in the cylinder head members 46 form the inlets to exhaust passages 78 formed in the cylinder head members 46 and which are adapted to detachably received an exhaust system shown in phantom and indicated by the reference numeral 79 for discharging the exhaust gasses from the combustion chambers to the atmosphere. Since the exhaust system 79 constitutes no part of the invention, it has not been illustrated in detail and will not be described further. Those skilled in the art will readily understand how the invention can be utilized with a wide variety of types of exhaust systems.

Figure 4:
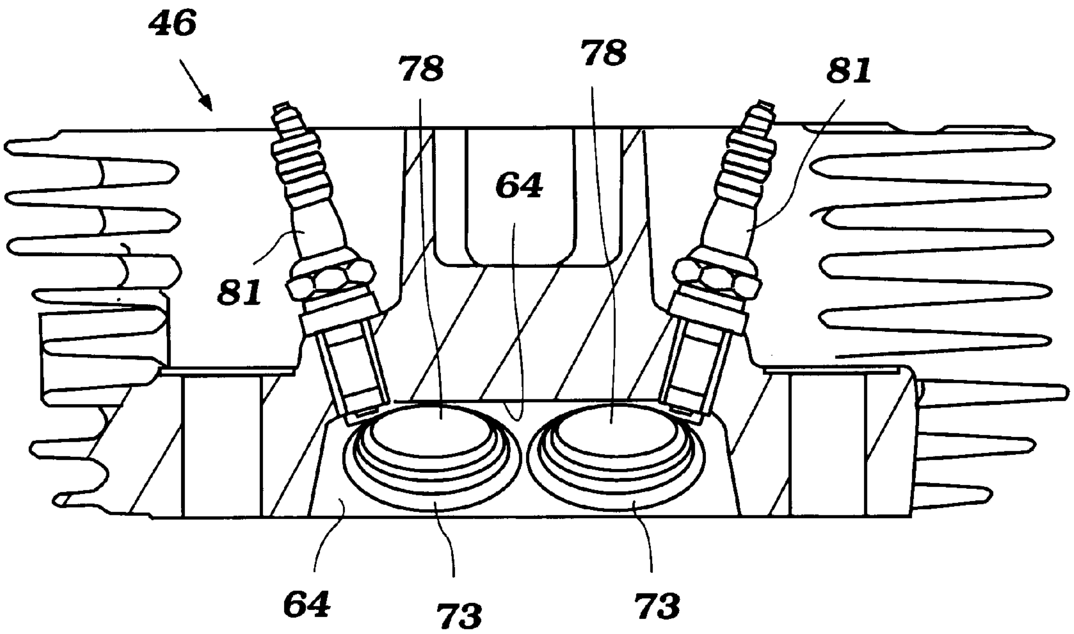
FIG. 4 is an enlarged cross sectional view through one of the cylinder head members of the cylinder head assembly taken along the same plane as FIG. 3.
Figure 5:
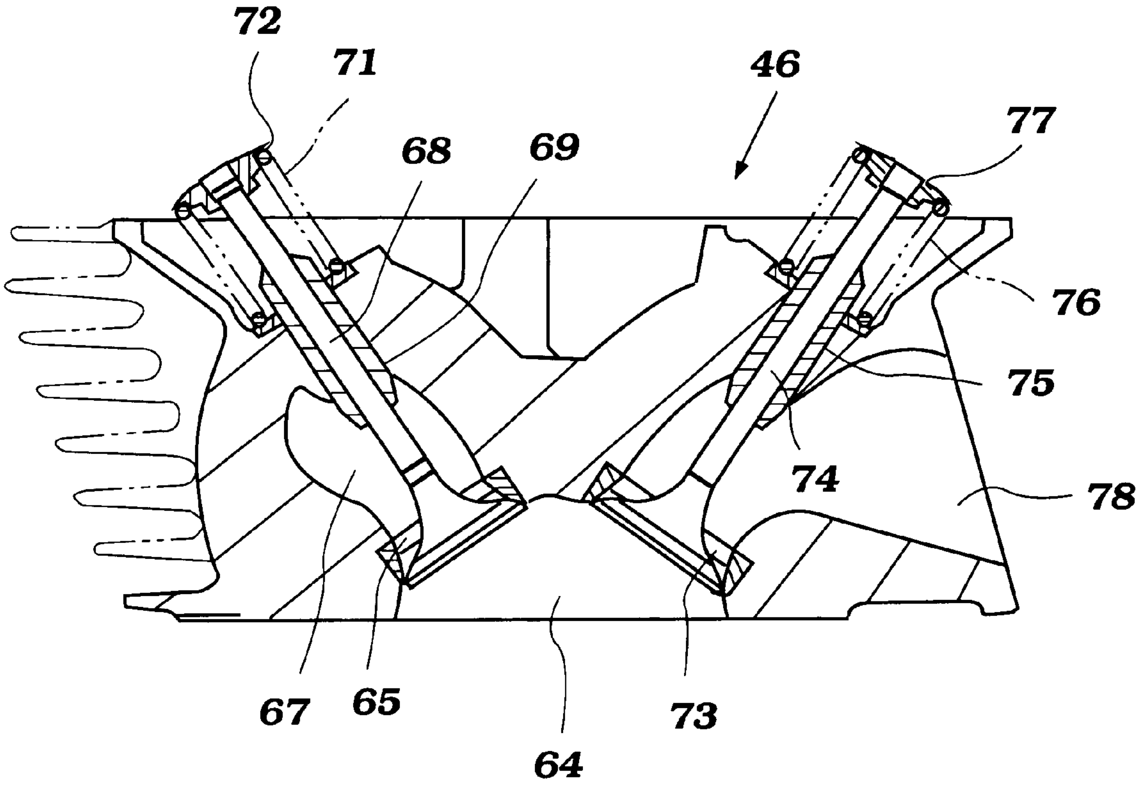
FIG. 5 is an enlarged cross sectional view through the one of the cylinder head members shown in FIG. 4 taken along a plane perpendicular to that plane.

The four valve per cylinder, cylinder head assembly 44 as thus far described is further complimented by a means of a dual ignition system. To this end, the cylinder head members 46 are each formed with a pair of tapped openings that receive spark plugs 81 as best seen in FIG. 4. These spark plugs 81 are fired by a suitable ignition system and will ensure rapid flame propagation and complete combustion of the fuel air charge that has been delivered to the combustion chambers from the carburetors 66.

At this point, it might be well to state that although the invention is described in conjunction with a carbureted engine, the principles of the invention can be equally as well utilized with engines having other types of charge formers, such as fuel injection systems.

The valve operating mechanism for operating the intake valve 68 and exhaust valves 74 for each cylinder bank will now be described by particular reference to FIGS. 2, 3, and 6 through 8, although portions of this valve operating mechanism also appears in other figures.

First, it should be noted that the crankcase member 38 is formed with an internal wall that has a central opening 82 through which one and of the crankshaft 39 extends. A timing gear 83 is affixed for rotation with this end of the crankshaft 39 by means that include a fastener assembly 84 and key arrangement so that the timing gear 83 will be driven at crankshaft speed. The wall of the crankcase member through which the crankshaft extends is formed with a cylindrical projection indicated in the drawings by the reference numeral 85 for reference purposes.

Figure 7:
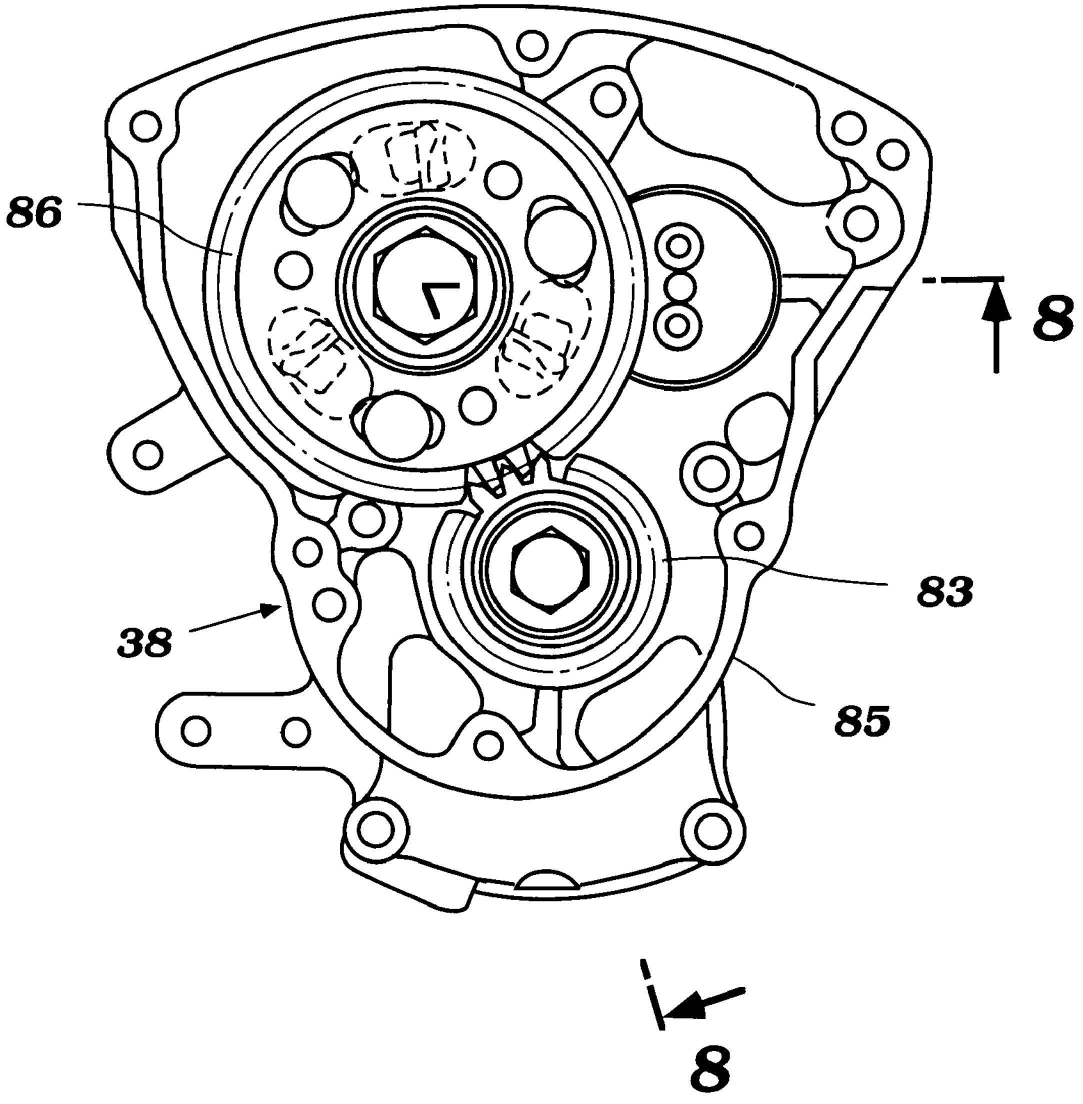
FIG. 7 is a view looking in the same direction as FIG. 6 but showing the timing driving for the camshafts.
Figure 8:
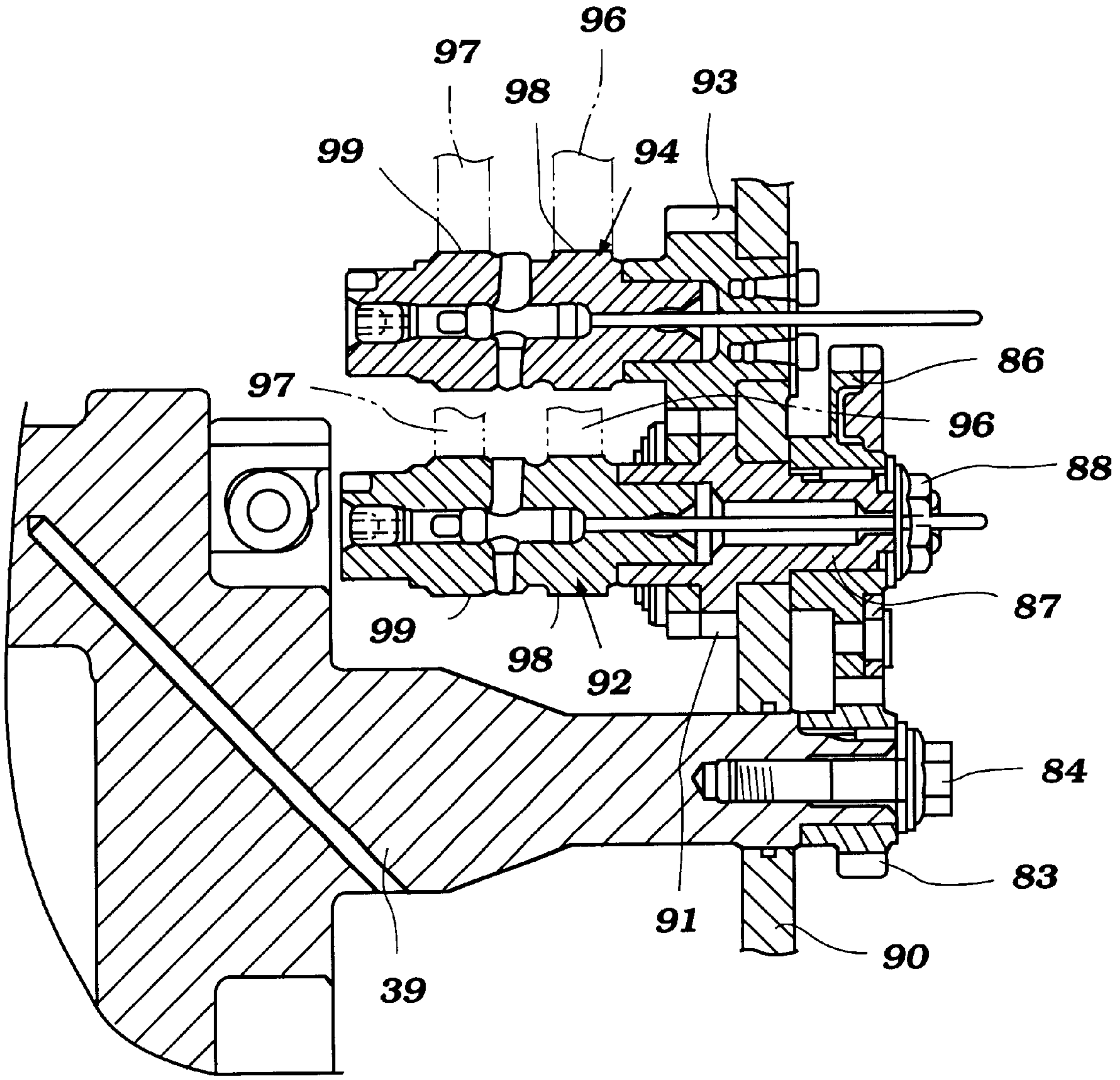
FIG. 8 is an enlarged cross sectional view taken along the line 8—8 in FIG. 7 showing further details of the cam shaft drive.

As best seen in FIGS. 7 and 8, the timing gear 83 is encircled by the projection 85 and is in this area enmeshed with a driven camshaft timing gear assembly, indicated generally by the reference numeral 86. This timing gear assembly 86 is of the split gear type so as to take up backlash in the system. This assembly is held onto a cam driving shaft 87 by means of a threaded fastener 88. There is a two to one speed reduction in this transmission, as is well known in the art.

This shaft 87 penetrates through a cover 90 that forms a gear case with the wall projection 85 and there drives a first camshaft driving gear 91 which has a driving relationship with a first camshaft 92 which is associated with one of the cylinder banks 36 and 37. In the illustrated figures, this is the cylinder bank 36.

The driving gear 91 is also a split-type backlash take up type of gear and is drivingly coupled to a second camshaft driving gear 93 which is associated with a camshaft 94 for the remaining cylinder bank, i.e., the cylinder bank 36. Because of this relationship between the driving gears 91 and 93, these gears will rotate in opposite directions.

The area above the crankcase member projection 85 adjacent each camshaft 92 and 94 and on the upper side thereof is formed with an opening that receives a tappet body 95. Each tappet body 95 is formed with a pair of bores that receive, respectively, an intake tappet 96 and an exhaust tappet 97 for the respective cylinder banks. These tappets 96 and 97 are engaged by the intake and exhaust cam lobes 98 and 99, respectively, of each camshafts 92 and 94. Since the construction of each camshaft is basically the same, except for the fact that they rotate in opposite directions, the same reference numerals are applied to the cam lobes 98 and 99 and the tappet bodies 96 and 97 for each cylinder bank.

Figure 6:
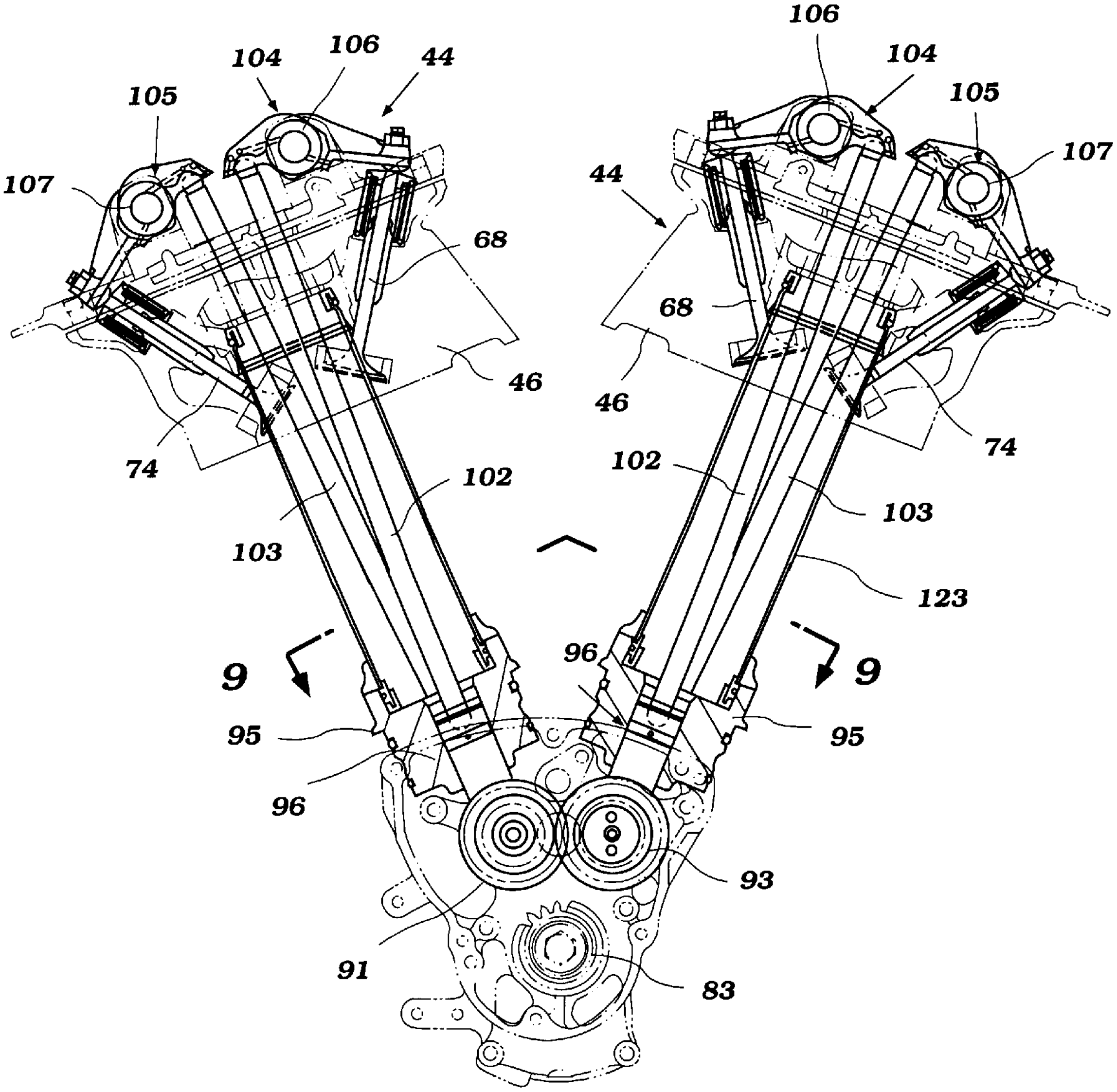
FIG. 6 is an enlarged view looking in the same general direction as FIG. 2, but showing the valve operating mechanism in solid lines with the remainder of the engine being shown in phantom.

As has been noted, the engine 22 is air cooled and to this end, both the cylinder barrels 36 and 37 are formed with cooling fins 101. These cooling fins 101 extend generally around the periphery of the engine body, but are partially interrupted on the sides adjacent the camshaft 92 and 94 so as to provide recesses through which push rods 102 and 103 for each cylinder bank extend. The push rods 102 are associated with the intake tappets 96, while the push rods 103 are associated with the exhaust tappets 97. These push rods 102 and 103 extend upwardly and in effect cross over each other slightly as seen in FIGS. 2 and 6. These push rods 102 and 103 are encircled by a protective tube in a manner which will be described shortly.

Referring now primarily to FIGS. 2, 6, 14 and 15 the intake and exhaust valve push rods 102 and 103, respectively, extend upwardly along the side of the respective cylinder barrels 36 and 37 to the cylinder head assemblies 44. The upper end of each of these push rods 102 and 103 cooperate with respective rocker arms 104 and 105 that are supported for pivotal movement on rocker arm shafts 106 and 107.

These rocker arm shafts 106 and 107 are journaled in bosses 108 and 109, respectively, formed in the cylinder head rocker arm support member 47. As may be best seen in FIGS. 14 and 15, the rocker arms 102 and 103 pass through a central opening 111 formed in a downwardly extending guide portion 112 of the rocker arm carrier 47.

The rocker arms 104 and 105 have follower portions 113 and 114 that define spherical sockets into which the ends of the push rods 102 and 103 extend. These extensions 113 and 114 are formed at one side of the rocker arm assemblies 104 and 105. At the other ends thereof, the rocker arm assembly 104 has a pair of extending arms 115 and 116 that are engaged with the tips of the intake valves 68 for their actuation. An adjusting screw 117 is provided on only one of these rocker arm extensions, this being the extension 115, so as to permit adjustment of the lash in the intake valve train.

In a similar manner, the rocker arm 105 has a pair of valve actuating portions 118 and 119 that cooperate with the tips of the stems of the exhaust valves 74 for their actuation. Again, only the rocker arm portion 118 carries an adjusting screw 121 for adjusting the lash in the exhaust valves.

Figure 11:
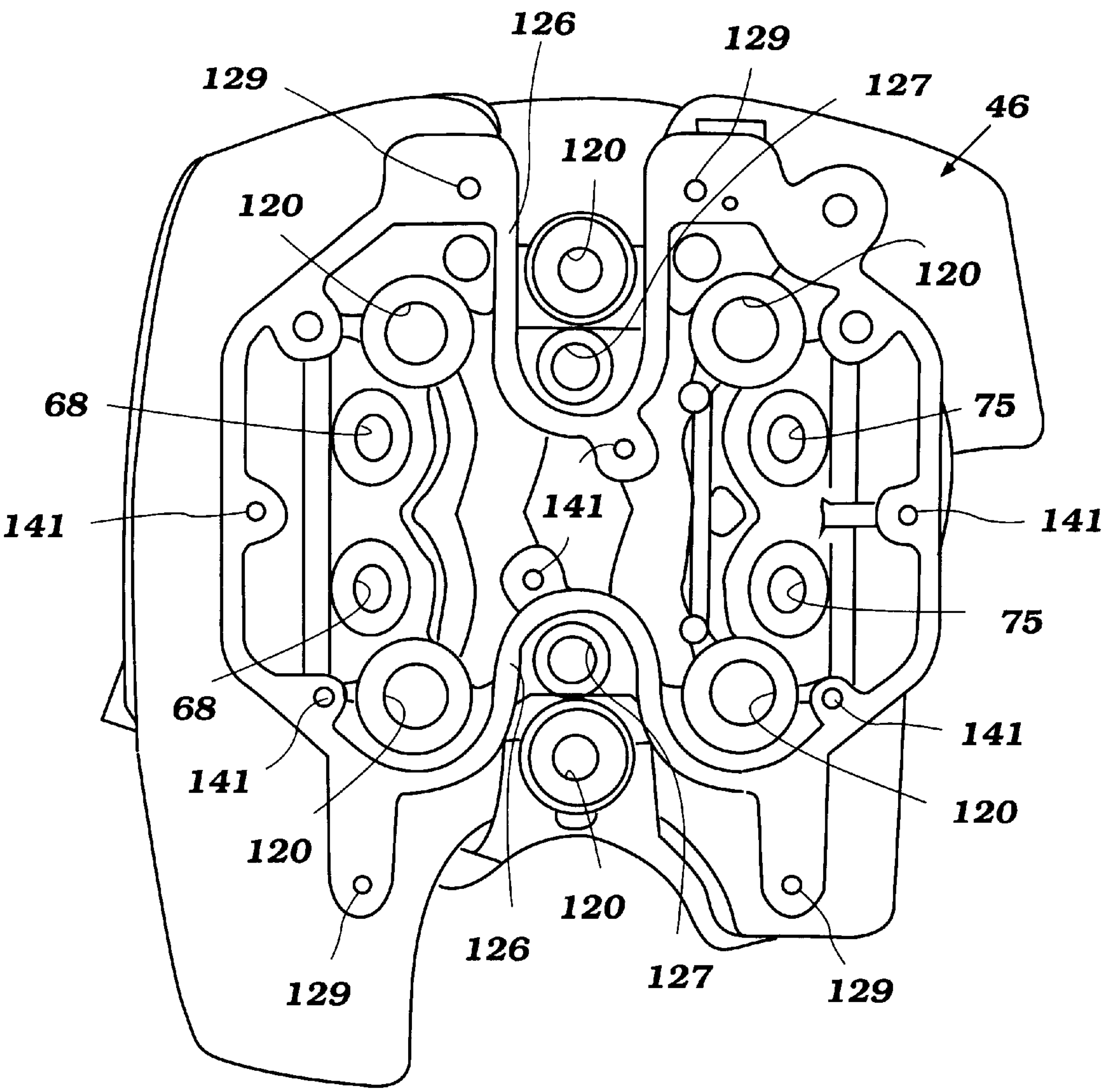
FIG. 11 is an enlarged top plan view of the main cylinder head member.
Figure 12:
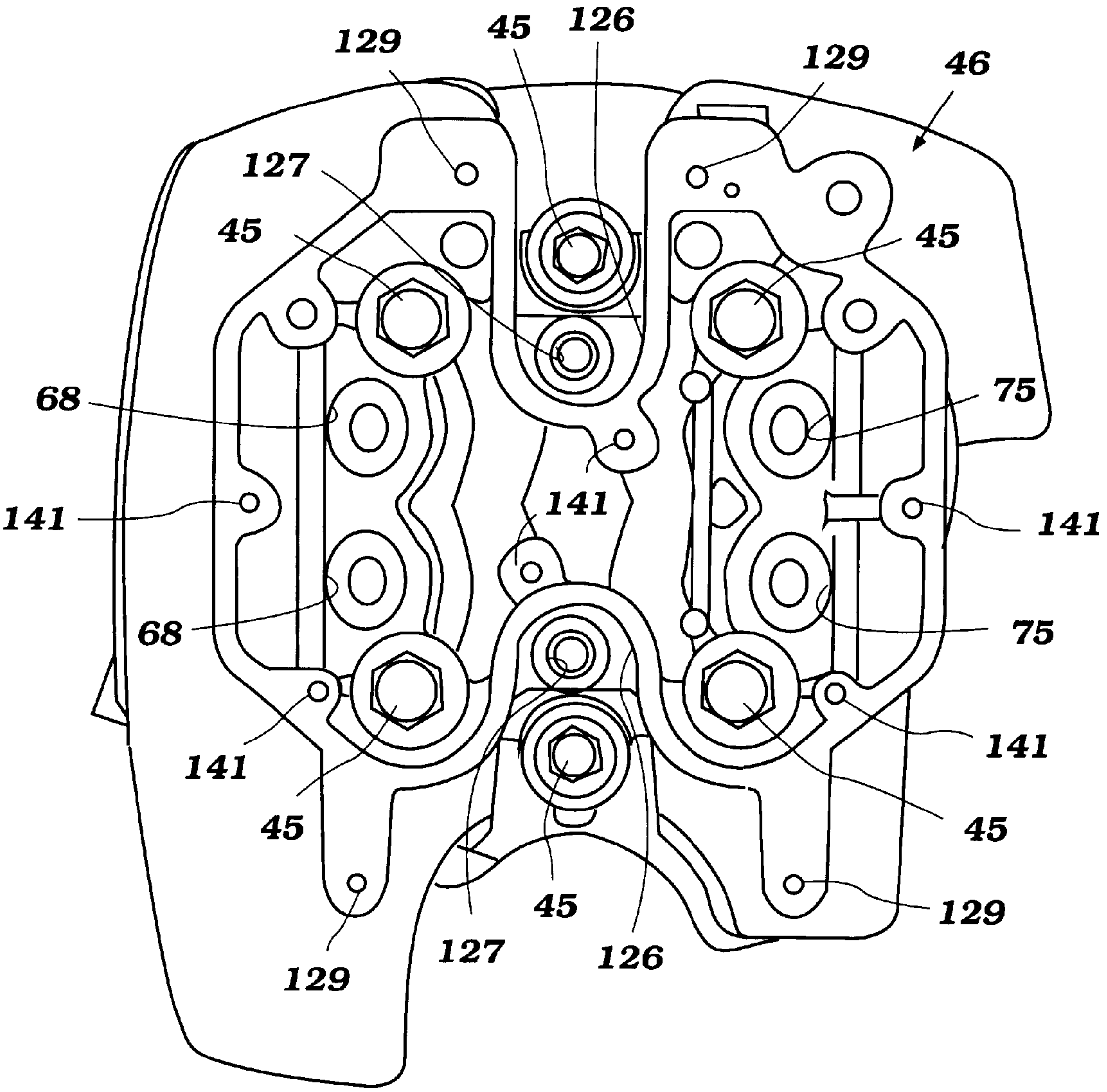
FIG. 12 is a view looking in the same direction as FIG. 11 and shows the main cylinder head member as attached to the associated cylinder block.

As may be best seen in FIGS. 11 and 12, the cylinder head member 46 has openings 120 to receive the fasteners 45 that affix the cylinder head member 46 to the cylinder blocks 36 and 37 and this assembly to the crankcase member 38. The rocker arm carrier 47 is suitably affixed to the cylinder head member 46. The head cover 48 is then fixed to the upper side of the rocker arm carrier 47 and the valve actuating mechanism is then closed by the valve covers 49. This construction will be described in more detail later by reference to FIGS. 10–17.

Figure 2:
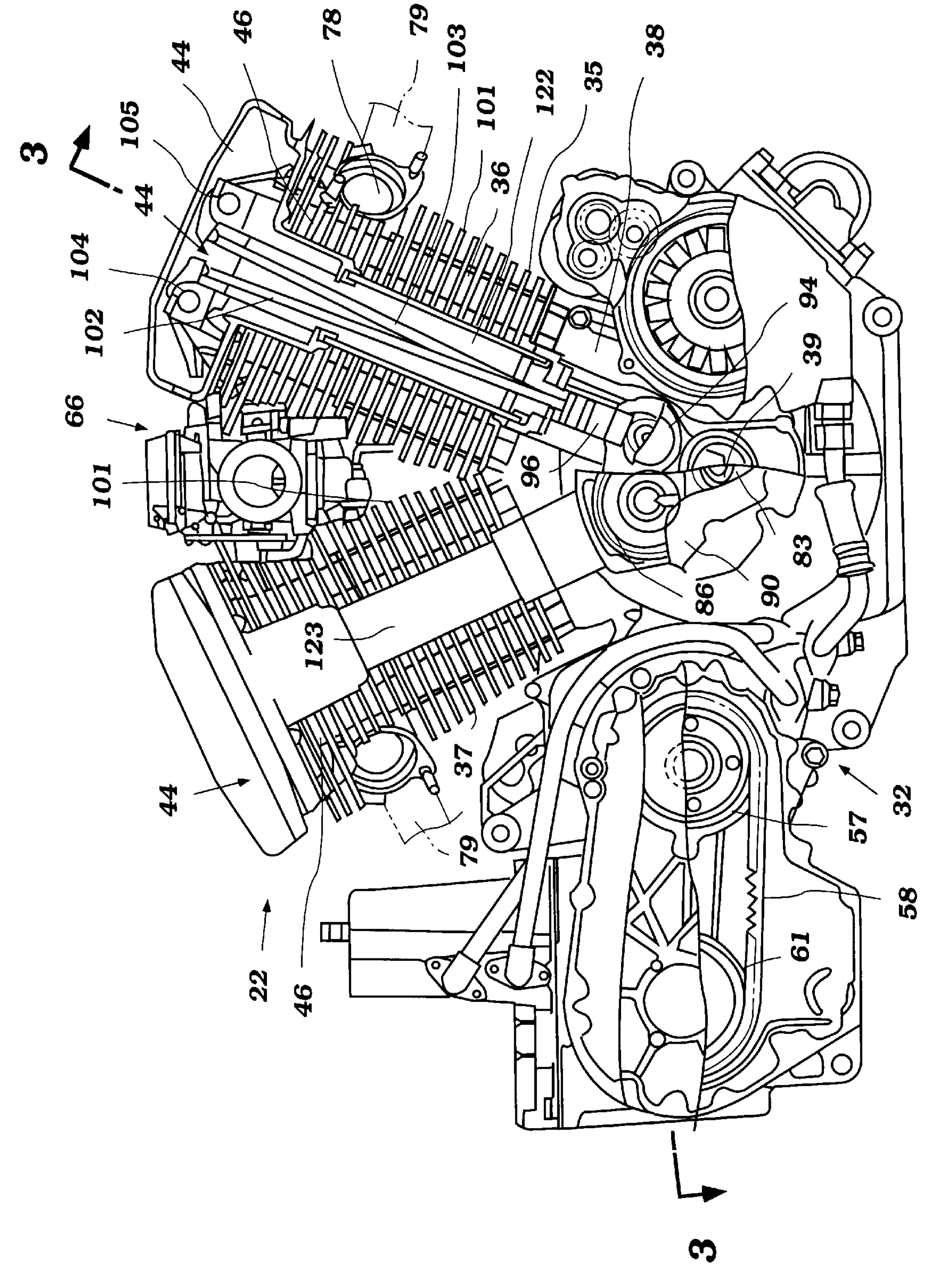
FIG. 2 is a side elevational view of the engine looking in the opposite direction from FIG. 1 and with the push rod covers either partially or completely removed and other portions broken away to show portions of the valve operating mechanism.
Figure 3:
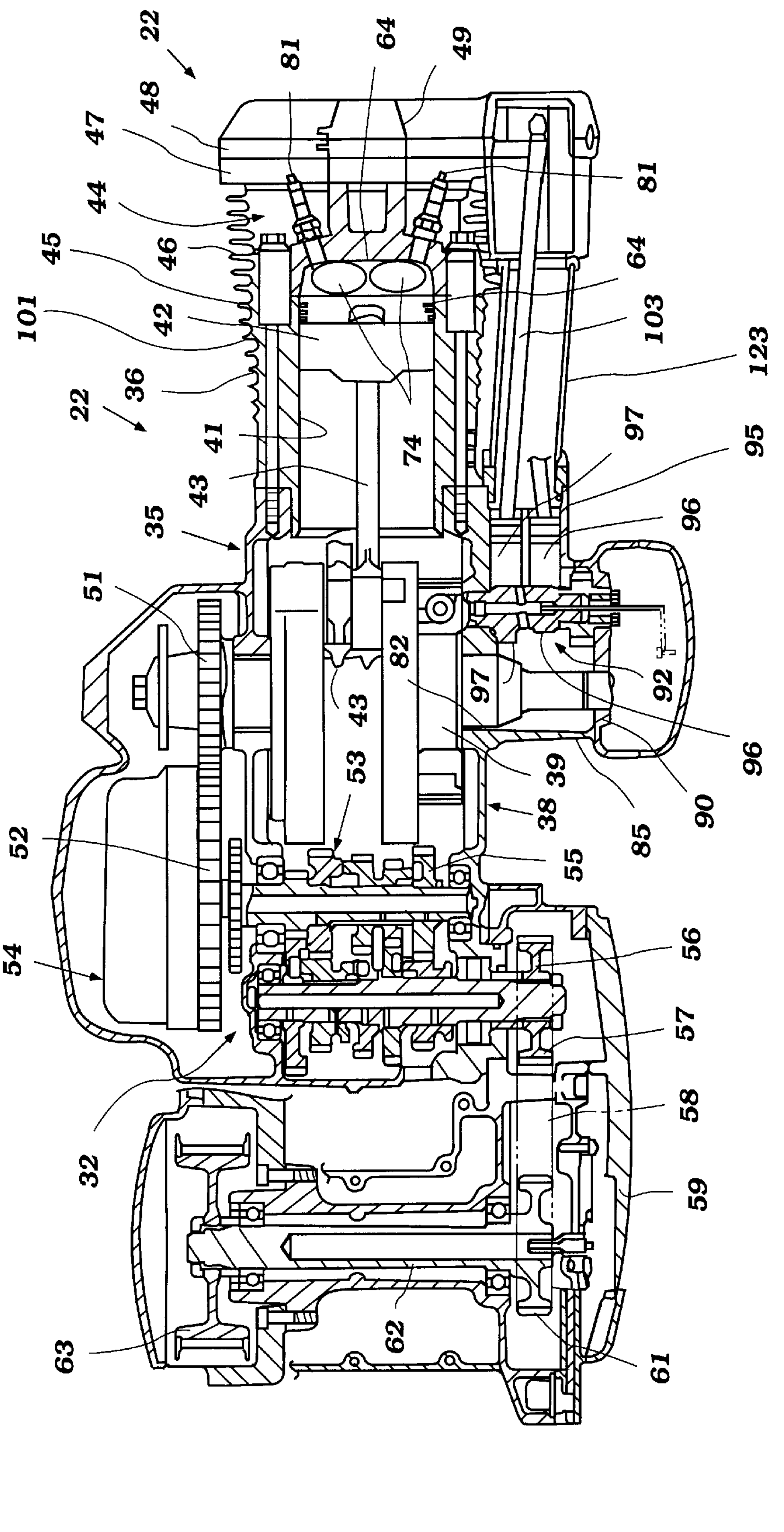
FIG. 3 is a cross-sectional view taken generally along the line 3—3 of FIG. 2.
Figure 9:
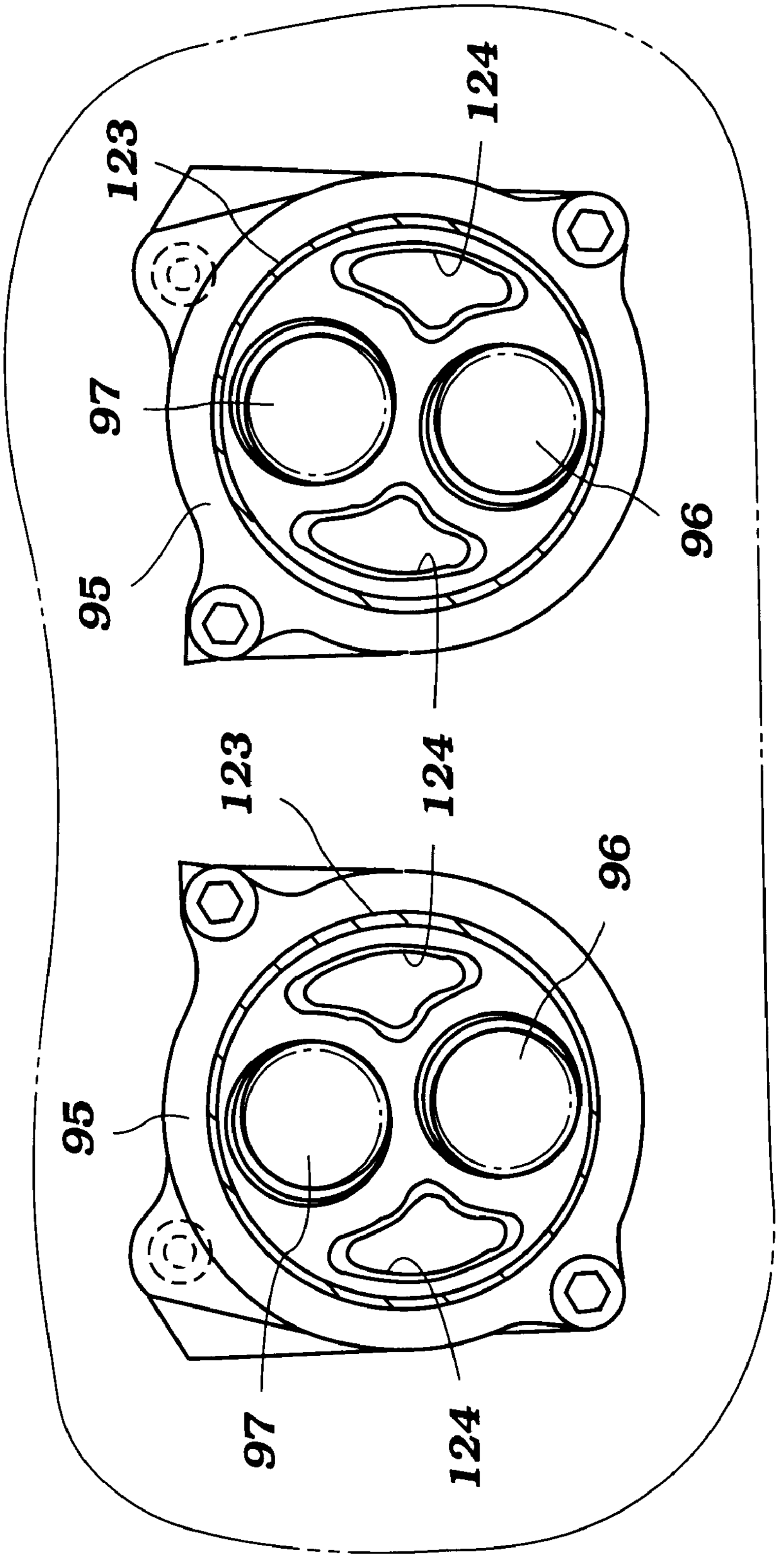
FIG. 9 is an enlarged cross-sectional view taken along a line 9—9 of FIG. 6 and shows the tappet supporting mechanism.

As best seen in FIG. 2, the cylinder blocks 36 and 37 have recesses 122 formed in one side thereof The push rods 102 and 103 extend through these recesses and are encircled by push rod tubes 123. As seen in FIG. 9, the lower ends of these push rod tubes 123 are sealingly engaged with the tappet carrier member 95 that is fixed to the crankcase member 38 and thus provide a good seal and protection in this area. These tappet carrier members 95 are formed with lubricant return and crankcase ventilation openings 124 to permit lubricant supplied to lubricate the valve operating mechanism in the cylinder head assemblies 44 in a suitable manner to drain back to the crankcase 32. Also these openings 124 facilitate crankcase ventilation including that within the valve covers 49.

In a like manner, the upper ends of these push rod tubes 123 are sealingly engaged within the projections 112 of the rocker arm carrier 47 and thus, the push rods 102 and 103 are well protected, but there is a neat overall appearance to the engine. Also, the push rods 102 and 103 can be easily removed for servicing, as should be readily apparent.

As should be apparent from the foregoing description, the invention deals primarily with the construction of the cylinder head assembly 44 and its manner of attachment to the respective cylinder blocks 36 and 37. This construction will now be described in detail by reference to FIGS. 10–17.

Referring first to the attachment of the main cylinder head member 46 to the respective cylinder blocks 36 or 37 and to FIGS. 10–12, it has been noted that the cylinder head member 46 has openings 120 that pass the threaded fasteners 45 for affixing this member 46 to the cylinder block 36 or 37. In addition, locating pins 125 may be provided that are engaged in pilot openings in the cylinder blocks 36 and 37 and the cylinder head member 46 to ensure accurate location of the assembled parts.

It has also been noted that the spark plugs 81 are mounted in the cylinder head member 46. On each side of the cylinder head member 46, there are provided recesses 126 which provide clearance to tapped openings 127 into which these spark plugs 81 are threadedly engaged.

Of course, a cylinder head gasket 128 is interposed between the cylinder head member 46 and the respective cylinder block 36 and 37 for sealing purposes.

The upper end of the cylinder head member 46 is provided with a plurality of tapped openings 129 that are aligned with openings 131 formed in the rocker arm carrier member 47. When the rocker arm carrier 47 is assembled onto the main cylinder head member 46 a gasket 132 is interposed therebetween. Threaded fasteners 133 are then passed through these openings 131 and threaded into the tapped openings 129 of the cylinder head member 46 so as to fix the rocker arm carrier 47 thereto.

Once the rocker arm carrier 47 is affixed to the cylinder head member 46 (FIG. 15), the rocker arm shaft 106 and 107 can be inserted into the bosses 108 and 109, respectively. The end bosses 108 and 109 adjacent the push rods 102 and 103 are formed with tapped openings 134 to receive locking fasteners 135 so as to hold the rocker arm shafts 106 and 107 in the bosses 108 and 109.

Having thus positioned the rocker arm carrier 47 into assembly with the cylinder head member 46, then the cylinder head cover 48 is placed on this assembly. A sealing gasket 135 is positioned between the cylinder head cover 48 a peripheral flange 137 of the rocker arm carrier 47. Then threaded fasteners 138 are fixed in placed. These threaded fasteners 138 pass through respective openings 139 formed in the rocker arm carrier 48 and are threaded into tapped holes 141 formed in the cylinder head member 46. The assembly thus now is as appears in FIG. 16.

Figure 13:
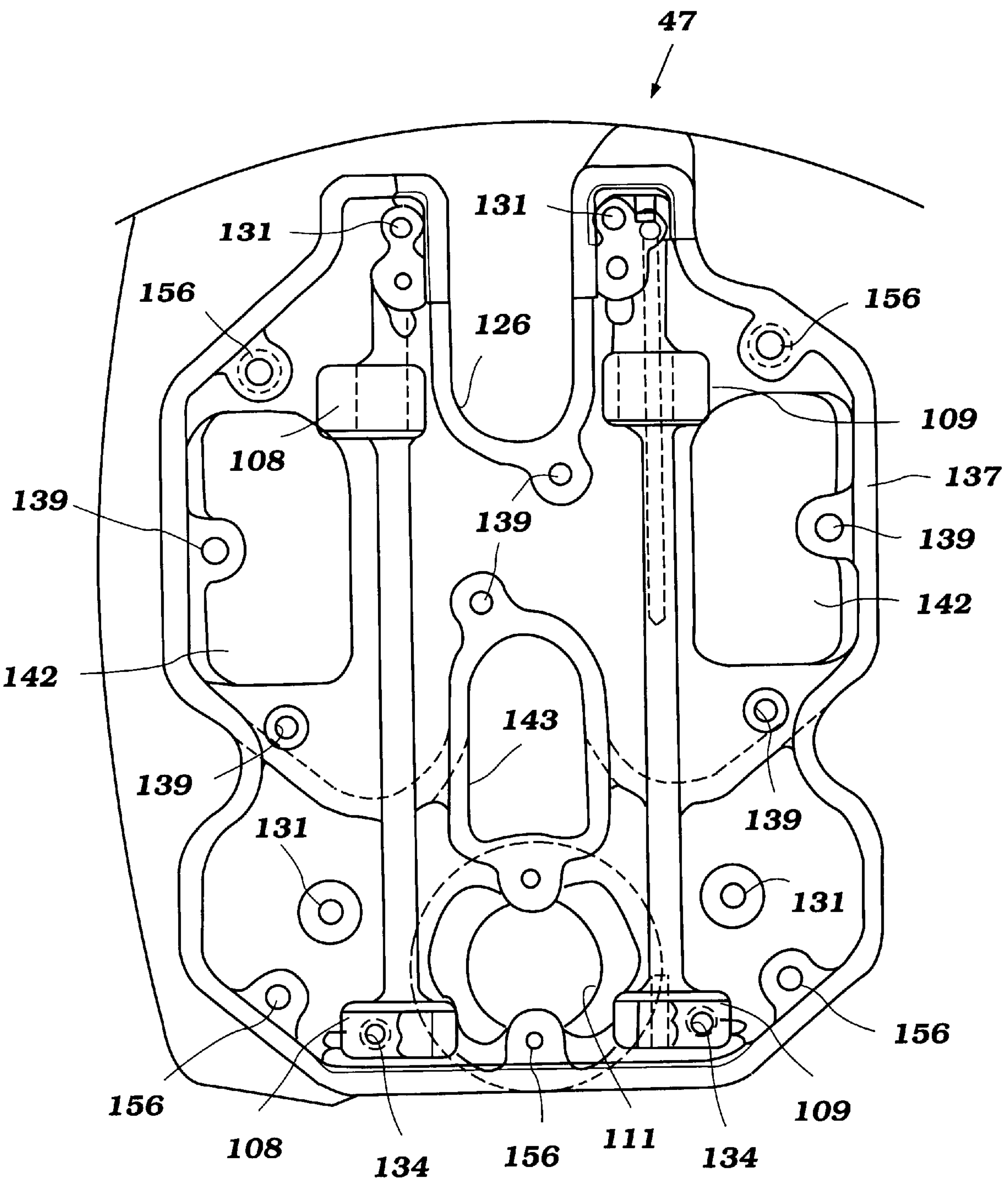
FIG. 13 is a top plan view showing the rocker arm carrier member of the cylinder head assembly before attachment.
Figure 14:
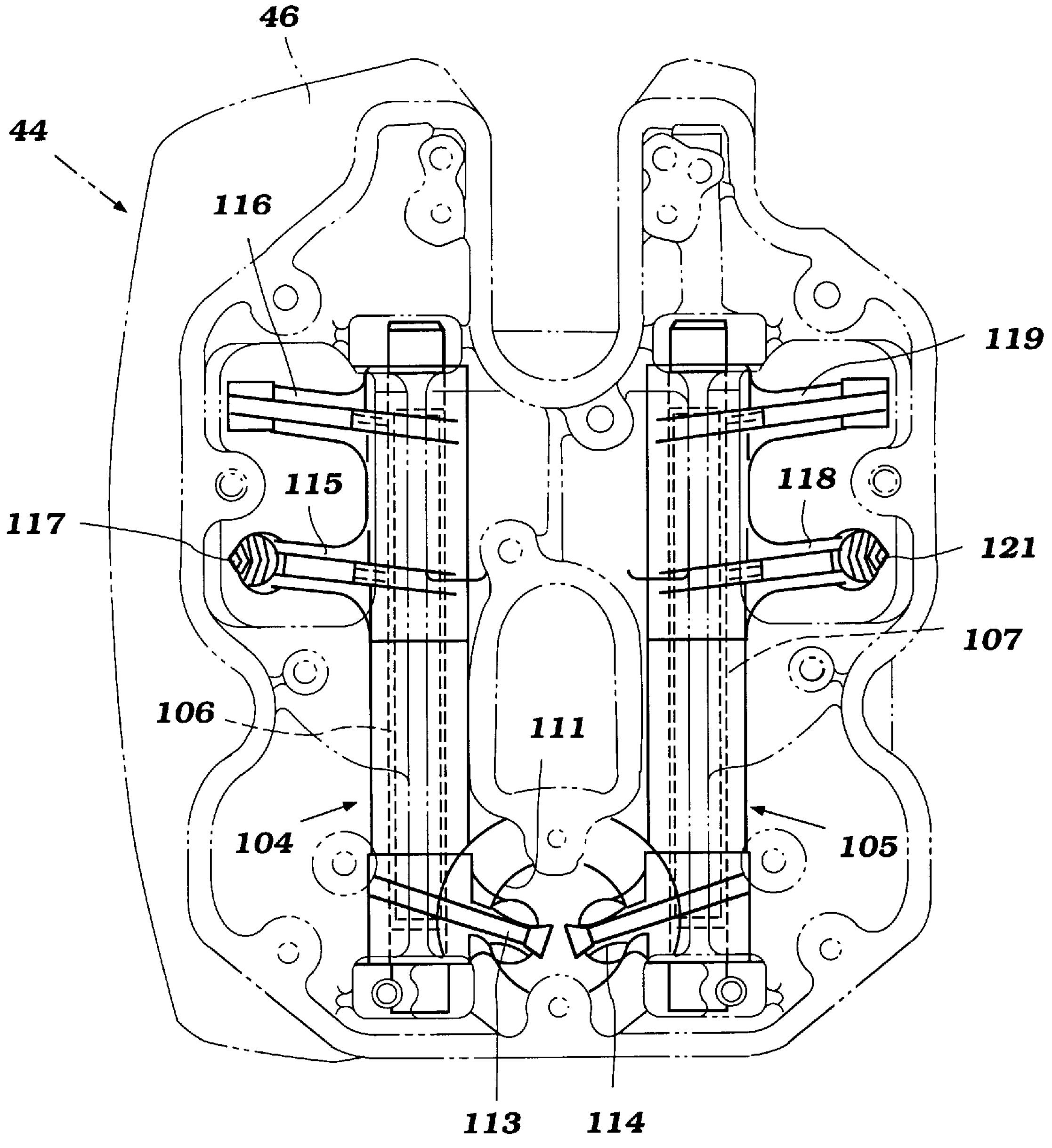
FIG. 14 is a top plan view showing in solid lines the rocker arm mechanism associated with the rocker arm carrier member with the rocker arm carrier member being shown in phantom.
Figure 15:
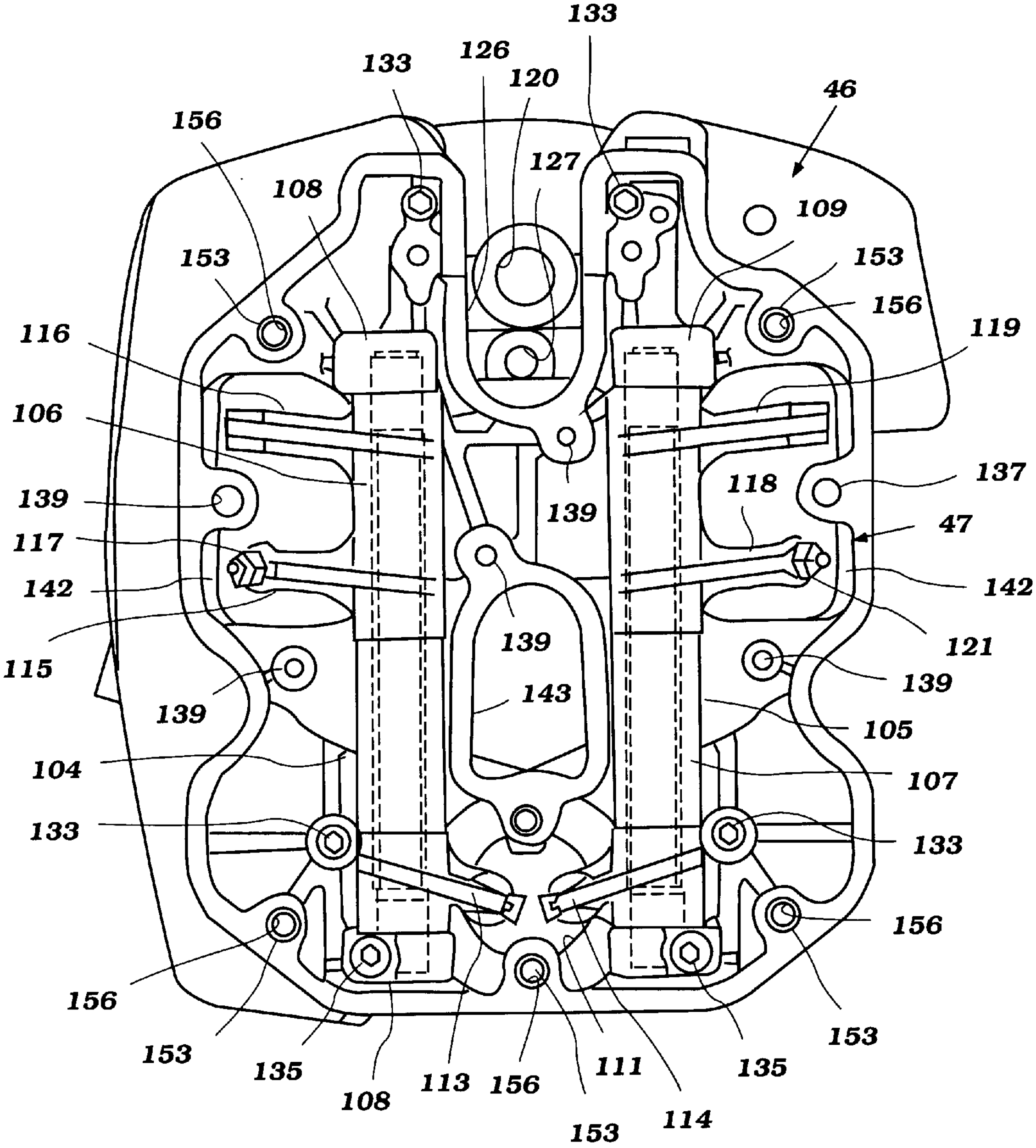
FIG. 15 is a top plan view showing the rocker arm carrier member, rocker arms and main cylinder head member assembled.

Referring now primarily to FIGS. 13 and 15, it be seen that the rocker arm carrier 47 is provided with a pair of windows 142 which overlie the valve guides 68 and 75 at each side of the cylinder head assembly 44 so as to permit the valve stems and springs to extend upwardly through this rocker arm carrier member 47. In addition, the rocker arm carrier member 47 is provided with an additional window 143 which overlies one of the spark plug wells 127 so that the spark plug 81 can pass therethrough. The remaining spark plug well 127 is open through the recess 126 which overlies the corresponding recess of the same number formed in the cylinder head member 46.

Figure 16:
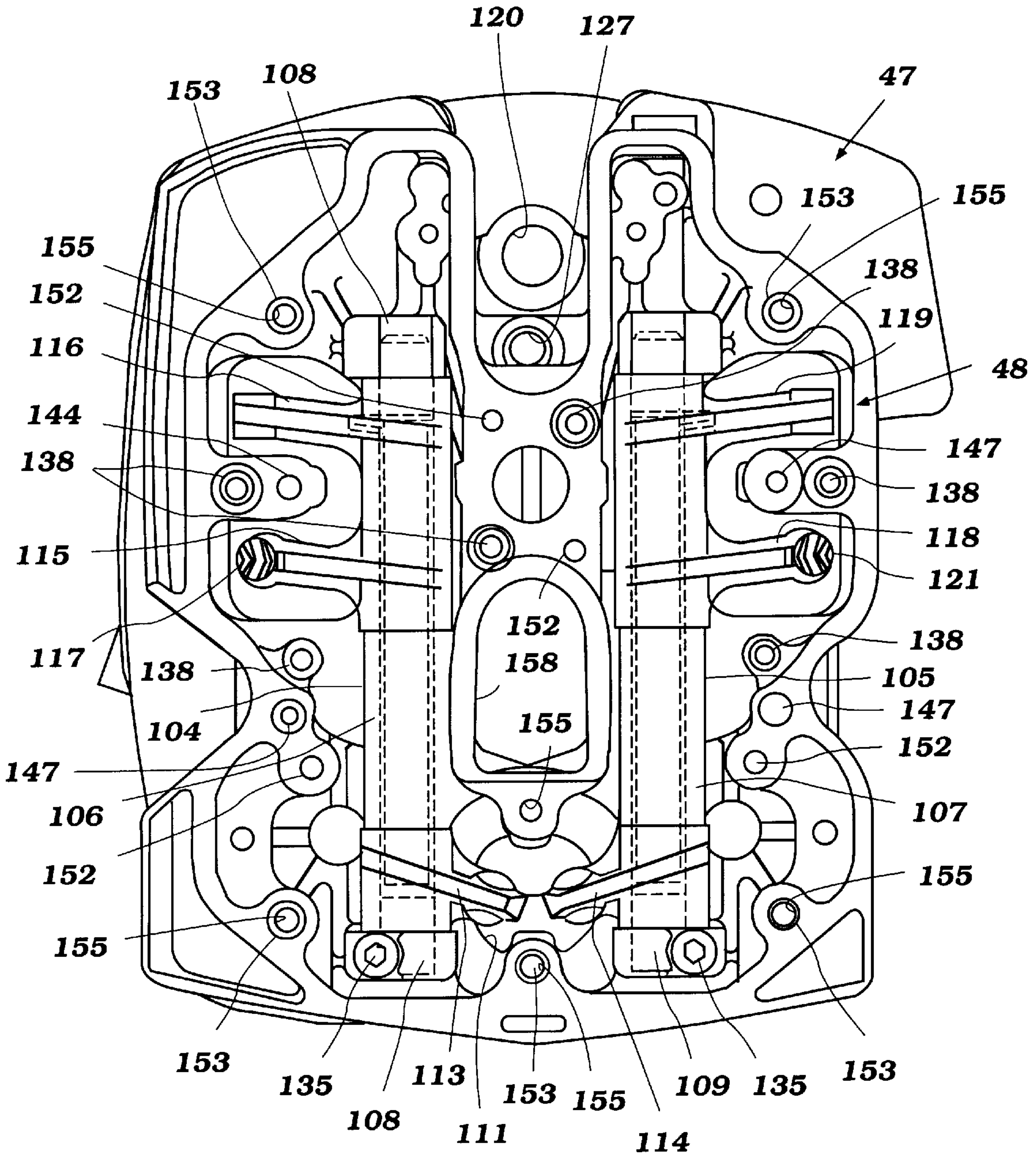
FIG. 16 is a top plan view showing the cylinder head cover affixed to the assembly shown in FIG. 15.
Figure 17:
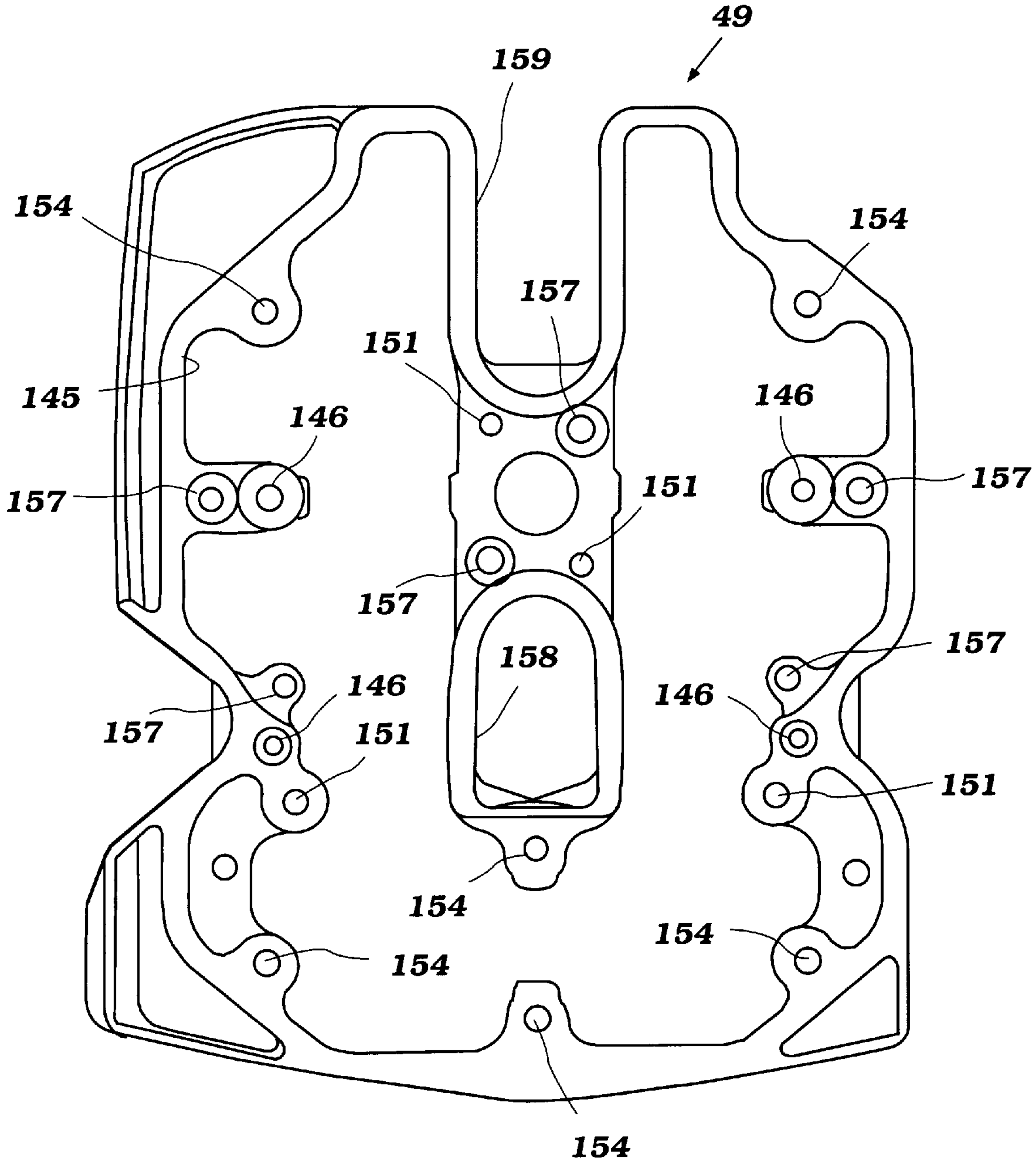
FIG. 17 is a bottom plan view of the valve cover member.
Figure 18:
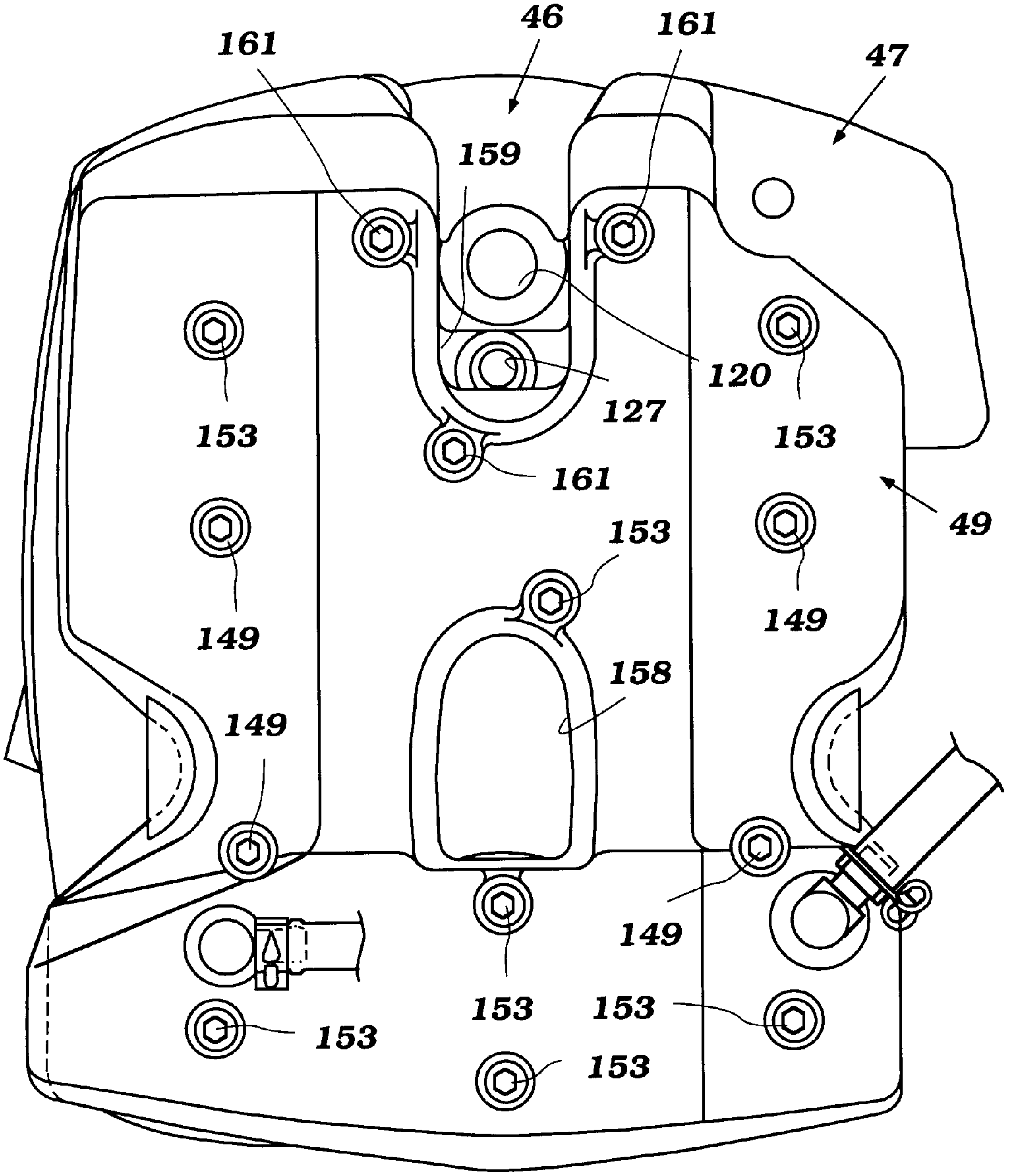
FIG. 18 is a top plan view showing the completed cylinder head assembly with the cam cover in place.

Once the cylinder head assembly is completed in the configuration as shown in FIG. 16, it is ready to receive the valve cover 49. The cylinder head cover member 48 has an upper surface that receives a sealing gasket 144. The valve cover 49 has a lower surface 145 that engages this gasket 144 this surface 145 being shown in FIG. 17.

A plurality of openings 146 are formed in this surface 145 and overlie tapped openings 147 formed in the cylinder head cover member 48 so as to receive threaded fasteners 149 for fixing the valve cover 49 to the cylinder head cover 48 and accordingly the subassembly previously described. Alignment with the cylinder head cover 48 is also facilitated by locating pins (not shown) received in bored holes 151 and 152 formed in the facing surfaces of the valve cover 49 and cylinder head cover 48, respectively.

In addition to the fasteners 149 that fix the valve cover 49 to the cylinder head cover 48 directly there are further fasteners 153 that provide a connection directly to the rocker arm carrier 47. These fasteners 153 pass through holes 154 formed in the valve cover 49 and openings 155 formed in the cylinder head cover 48. They are received in tapped holes 156 formed in the rocker arm carrier 48. Thus these fasteners 153 function to sandwich the head cover 48 between the valve cover 49 and the rocker arm carrier 47.

The valve cover surface 145 is also formed with reliefs 157 to clear the head cover fasteners 138.

Finally access to the spark plugs 81 is facilitated by an opening 158 that is aligned with the rocker arm carrier opening 143 and one of the cylinder head recesses 126. A recess 159 of the valve cover 49 is aligned with the other cylinder head recess 126 and the like numbered recess of the head cover 48. Encircling this recess 159 are lugs that receive fasteners for mounting an accessory such as a wire loom or the like (not shown).

Thus, from the foregoing description, it should be readily apparent that the engine construction is quite compact and provides a very effective way cylinder head assembly that facilitates assembly and servicing. Of course, the foregoing description is that of the preferred embodiment of the invention and various changes and modifications may be made without departing from the spirit and scope of the invention, as defined by the appended claims.

What is claimed is:

1. A cylinder head assembly for an internal combustion engine comprised of at least four major members comprising a main cylinder head member which forms the combustion chamber of the engine with a piston and an associated cylinder bore, said main cylinder head member also forming flow passages for induction of a charge into the combustion chamber and exhaust of a charge from the combustion chamber; a rocker arm carrier member detachably connected to said main cylinder head member and supporting at least some components for the valve actuating mechanism for operating valves that control the flow through said flow passages of said main cylinder head member, a cylinder head cover member detachably connecting in part said rocker arm carrier member to said main cylinder head member and providing a peripheral area around the valve actuating mechanism; and a valve cover member affixed to the other of said members and enclosing the valve operating mechanism as well as facilitating its servicing.

2. A cylinder head assembly for an internal combustion engine as set forth in claim 1 wherein a first series of fasteners are provided for affixing the main cylinder head member to an associated cylinder block and a second series of fasteners fixing the rocker arm carrier member to the main cylinder head member.

3. A cylinder head assembly for an internal combustion engine as set forth in claim 2 wherein the second series of fasteners only fix the rocker arm carrier member to the main cylinder head member.

4. A cylinder head assembly for an internal combustion engine as set forth in claim 2 wherein a third series of fasteners fix the cylinder head cover member to the rocker arm carrier member.

5. A cylinder head assembly for an internal combustion engine as set forth in claim 4 wherein the third series of fasteners only fix the cylinder head cover member to the rocker arm carrier member.

6. A cylinder head assembly for an internal combustion engine as set forth in claim 5 wherein a forth series of fasteners fix the cylinder head cover member to the main cylinder head member.

7. A cylinder head assembly for an internal combustion engine as set forth in claim 6 wherein the second series of fasteners only fix the rocker arm carrier member to the main cylinder head member.

8. A cylinder head assembly for an internal combustion engine as set forth in claim 4 wherein a further series of fasteners fix the valve cover member to the cylinder head cover member.

9. A cylinder head assembly for an internal combustion engine as set forth in claim 8 wherein the third series of fasteners only fix the cylinder head cover member to the rocker arm carrier member.

10. A cylinder head assembly for an internal combustion engine as set forth in claim 9 wherein a forth series of fasteners fix the cylinder head cover member to the main cylinder head member.

11. A cylinder head assembly for an internal combustion engine as set forth in claim 10 wherein the second series of fasteners only fix the rocker arm carrier member to the main cylinder head member.

12. A cylinder head assembly for an internal combustion engine as set forth in claim 1 wherein the main cylinder head member mounts at least one spark plug for firing a charge in the combustion chamber and at least one of the other members forms an opening through which the spark plug can be accessed.

13. A cylinder head assembly for an internal combustion engine as set forth in claim 12 wherein all of the other members forms aligned openings through which the spark plug can be accessed.

14. A cylinder head assembly for an internal combustion engine as set forth in claim 1 wherein the rocker arm carrier member supports at least one rocker arm on a rocker arm shaft.

15. A cylinder head assembly for an internal combustion engine as set forth in claim 14 wherein the rocker arm is actuated by a push rod located at one side of the cylinder block to which the cylinder head assembly is fixed.

16. A cylinder head assembly for an internal combustion engine as set forth in claim 14 wherein the push rod encircled by a push rod tube that is enclosed at one end by the cylinder head assembly.

17. A cylinder head assembly for an internal combustion engine as set forth in claim 16 wherein the push rod tube is enclosed by the rocker arm carrier member.

18. A cylinder head assembly for an internal combustion engine as set forth in claim 17 wherein the rocker arm carrier member is formed with a projection that lies on one side of the main cylinder head member in which the push rod tube is enclosed.

* * * * *